US011609968B2

(12) United States Patent
Meng et al.

(10) Patent No.: US 11,609,968 B2
(45) Date of Patent: Mar. 21, 2023

(54) IMAGE RECOGNITION METHOD, APPARATUS, ELECTRONIC DEVICE AND STORAGE MEDIUM

(71) Applicant: TENCENT TECHNOLOGY (SHENZHEN) COMPANY LIMITED, Guangdong (CN)

(72) Inventors: Jintao Meng, Shenzhen (CN); Haidong Lan, Shenzhen (CN); Minwen Deng, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 525 days.

(21) Appl. No.: 16/905,010

(22) Filed: Jun. 18, 2020

(65) Prior Publication Data

US 2020/0320369 A1  Oct. 8, 2020

Related U.S. Application Data

(63) Continuation of application No. PCT/CN2019/076816, filed on Mar. 4, 2019.

(30) Foreign Application Priority Data

Mar. 30, 2018  (CN) .......................... 201810310628.X

(51) Int. Cl.
*G06F 17/16* (2006.01)
*G06N 3/04* (2023.01)
(Continued)

(52) U.S. Cl.
CPC .............. *G06F 17/16* (2013.01); *G06F 18/21* (2023.01); *G06N 3/02* (2013.01); *G06N 3/04* (2013.01);
(Continued)

(58) Field of Classification Search
CPC ......... G06F 17/16; G06F 18/21; G06V 10/70; G06V 10/82; G06N 3/02; G06N 3/04; G06N 3/08
See application file for complete search history.

(56) References Cited

FOREIGN PATENT DOCUMENTS

| CN | 107247949 A | 10/2017 |
| CN | 107609638 A | 1/2018 |
| WO | 2017/214968 A1 | 12/2017 |

OTHER PUBLICATIONS

International Search Report for PCT/CN/2019/076816, dated Jun. 11, 2019.
(Continued)

*Primary Examiner* — David Perlman
(74) *Attorney, Agent, or Firm* — Sughrue Mion, PLLC

(57) ABSTRACT

An image recognition method, an apparatus, an electronic device, and a storage medium. The method may include extracting input matrices from a target image through input channels of a convolutional layer in a convolutional neural network model, obtaining first and second result matrices by traversing input matrices and performing input transformation and convolution kernel transformation, respectively, on the traversed input matrices through the row transformation reconstruction, performing matrix multiplication reconstruction on the first and second result matrices to obtain to-be-transformed matrices, performing output transformation on the to-be-transformed matrices through the row transformation reconstruction to obtain output matrices, splicing the output matrices and outputting the spliced output matrices through output channels of the convolutional layer to obtain a convolution result, and obtaining an image recognition result based on the convolution result into a pooling layer in the convolutional neural network model to perform an image recognition on the target image.

20 Claims, 11 Drawing Sheets

(51) Int. Cl.
     *G06N 3/08*     (2023.01)
     *G06N 3/02*     (2006.01)
     *G06V 10/70*     (2022.01)
     *G06V 10/82*     (2022.01)
     *G06F 18/21*     (2023.01)

(52) U.S. Cl.
     CPC ............... *G06N 3/08* (2013.01); *G06V 10/70* (2022.01); *G06V 10/82* (2022.01)

(56) References Cited

OTHER PUBLICATIONS

Written Opinion of the International Searching Authority dated Jun. 11, 2019, in International Application No. PCT/CN2019/076816.
Communication dated Jun. 29, 2021, from the European Patent Office in application No. 19778369.9.
"A Method for Detecting a Stressful Event Based on Electrocardiogram (ECG) and Respiratory Inductance Plethysmography (RIP)", IP.com, IPCOM000248741D, Jan. 4, 2017, pp. 1-7 ( 8 pages total).
Sanghyun Seo et al., "Hybrid Approach for Efficient Quantization of Weights in Convolutional Neural Networks", IEEE International Conference on Big Data and Smart Computing, 2018, pp. 638-641 ( 4 pages total).
Zelong Wang et al., "Winograd Algorithm for 3D Convolution Neural Networks", International Conference on Image Analysis And Processing, Computer Science Department, national University of Defense Technology, Oct. 25, 2017, pp. 609-616 ( 8 pages total).

IMAGE RECOGNITION METHOD, APPARATUS, ELECTRONIC DEVICE AND STORAGE MEDIUM

CROSS-REFERENCE TO RELATED APPLICATION(S)

This application is a continuation of PCT/CN2019/076816, and is based on and claims priority to Chinese Patent Application No. 201810310628.X, entitled "IMAGE RECOGNITION METHOD, APPARATUS, ELECTRONIC DEVICE AND STORAGE MEDIUM", filed on Mar. 30, 2018, both of which are incorporated by reference herein in their entirety.

BACKGROUND

1. Field

Embodiments of the disclosure relate to the field of image processing, and in particular, to an image recognition method, apparatus, electronic device, and storage medium thereof.

2. Description of Related Art

With rapid development of electronic devices, computing capacities, storage capacities, standby capabilities, and the like thereof, intelligent image recognition services based on a convolutional neural network model, for example, facial and gesture recognition provided by a mobile terminal, obstacle avoidance, and intelligent navigation provided by an embedded device, have been implemented on electronic devices of different types.

Currently, a computational volume involved in a convolutional layer in the convolutional neural network model is very large, and computing resources, storage resources, and the like of an electronic device are likely to be exhausted, Accordingly, computing efficiency of the convolutional neural network model is degraded. Consequently, a low efficiency of image processing still remains in an image recognition method based on the convolutional neural network model.

SUMMARY

Embodiments of the disclosure provide an image recognition method, apparatus, electronic device, and storage medium, to solve the above problems of low efficiency in an image recognition method in the related art. However, the problems identified above are not limited thereto, and embodiments of the disclosure may solve other problems that are not identified herein.

According to an embodiment, there is provided an image recognition method, performed by an electronic device. The method may include: extracting a plurality of input matrices from a target image through input channels of a convolutional layer in a convolutional neural network model, the convolutional neural network model being executed in the electronic device; obtaining first result matrices by traversing the plurality of input matrices and performing input transformation on the traversed plurality of input matrices through row transformation reconstruction; obtaining second result matrices by performing convolution kernel transformation on the traversed plurality of input matrices through the row transformation reconstruction; performing matrix multiplication reconstruction on the first result matrices and the second result matrices to obtain to-be-transformed matrices; performing output transformation on the to-be-transformed matrices through the row transformation reconstruction to obtain a plurality of output matrices; based on traversing all of the plurality of input matrices, splicing the plurality of output matrices and outputting the spliced plurality of output matrices through output channels of the convolutional layer to obtain a convolution result, each spliced output matrix among the plurality of spliced output matrices corresponding to each input matrix among the plurality of input matrices; and obtaining an image recognition result by inputting the convolution result into a pooling layer in the convolutional neural network model to perform an image recognition on the target image.

According to an embodiment, there is provided an image recognition apparatus including: at least one memory configured to store computer program code and at least one processor configured to access the computer program code and operate as instructed by the computer program code. The computer program code including: an input matrix extraction code configured to cause the at least one processor to extract a plurality of input matrices from a target image through input channels of a convolutional layer in a convolutional neural network model, the convolutional neural network model being executed in the image recognition apparatus; a result matrix obtaining code configured to cause the at least one processor to obtain first result matrices by traversing the plurality of input matrices and performing input transformation on the traversed plurality of input matrices through row transformation reconstruction, and obtain second result matrices by performing convolution kernel transformation on the traversed plurality of input matrices through row transformation reconstruction; a to-be-transformed matrix obtaining code configured to cause the at least one processor to perform matrix multiplication reconstruction on the first result matrices and the second result matrices to obtain to-be-transformed matrices; an output matrix obtaining code configured to cause the at least one processor to perform output transformation on the to-be-transformed matrices through row transformation reconstruction to obtain a plurality of output matrices; a convolution result obtaining code configured to cause the at least one processor to, based on traversing all of the plurality of input matrices, splice the plurality of output matrices and output the spliced plurality of output matrices through output channels of the convolutional layer to obtain a convolution result, each spliced output matrix among the plurality of spliced output matrices corresponding to each input matrix among the plurality of input matrices; and an image recognition code configured to cause the at least one processor to obtain an image recognition result by inputting the convolution result into a pooling layer in the convolutional neural network model and performing an image recognition on the target image. According to an embodiment, there is provided a non-transitory computer-readable storage medium, storing a computer program including at least one instruction, when executed by a processor, cause the computer program to: extract a plurality of input matrices from a target image through input channels of a convolutional layer in a convolutional neural network model; obtain first result matrices by traversing the plurality of input matrices and performing input transformation on the traversed plurality of input matrices through row transformation reconstruction, and obtain second result matrices by performing convolution kernel transformation on the traversed plurality of input matrices through row transformation reconstruction; perform matrix multiplication reconstruction on the first result matrices and the second result matrices to obtain to-be-transformed matrices; perform output transformation on the to-be-transformed matrices through row transformation reconstruction to obtain a plurality of output matrices; based on traversing all of the plurality of input matrices, splice the plurality of output matrices and output the spliced plurality of output matrices through output channels of the convolutional layer to obtain a convolution result, each spliced output matrix among the plurality of spliced output matrices corresponding to each input matrix among the plurality of input matrices; and obtain an image recognition result by inputting the convolution result into a pooling layer in the convolutional neural network model and performing an image recognition on the target image.

BRIEF DESCRIPTION OF THE DRAWINGS

To describe the technical solution of the embodiments of the disclosure more clearly, the following description briefly introduces the accompanying drawings for describing the embodiments herein. Apparently, the accompanying drawings described below are only some of the embodiments of the disclosure, and a person of ordinary skill in the art may derive other embodiments from the accompanying drawings and the descriptions thereof without creative efforts.

DESCRIPTION

Example embodiments of the disclosure are described in detail herein, and examples of the embodiments are shown in the accompanying drawings. Unless otherwise indicated, same numbers in different accompanying drawings represent same or similar elements. The embodiments described in the following description do not represent all implementations of the disclosure.

Currently, for a 3×3 convolution kernel that is widely used in a convolutional neural network model, a Winograd F(2×2, 3×3) algorithm is provided. However, computing efficiency of the algorithm is relatively low in an actual application, and cannot reach a theoretical speedup of 2.25.

F(2×2, 3×3) represents that an output matrix in the Winograd algorithm is a 2×2 matrix, and a convolution kernel matrix is a 3×3 matrix.

Figure 1:
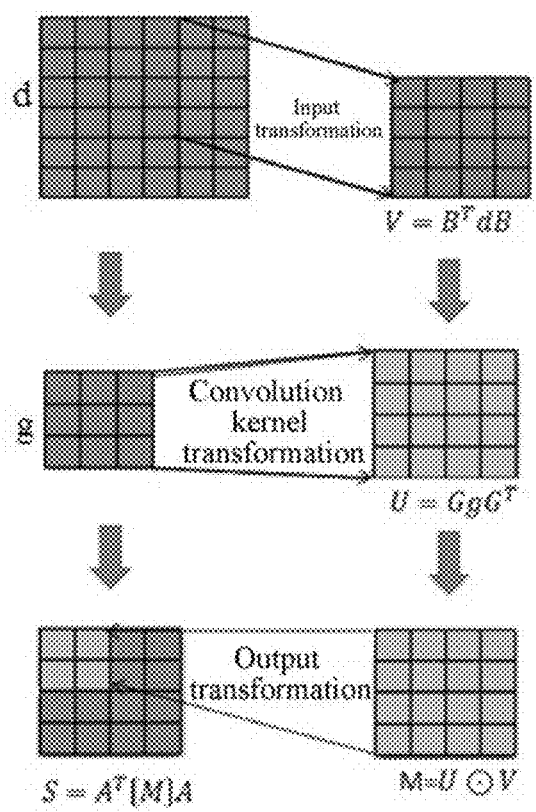
FIG. 1 is a schematic diagram of different algorithm stages of a convolutional neural network model in a related art.

Specifically, as shown in FIG. 1, the algorithm includes four key stages:

(1) Input transformation: $V=B_T dB$ (1)

(2) Convolution kernel transformation: $U=GgG^T$ (2)

(3) Multiplication: $M=U \odot V$ (3)

(4) Output transformation: $S=A^T MA$ (4)

For a convolutional neural network model deployed for image recognition, d is an input matrix, g is a convolution kernel matrix corresponding to the input matrix d, B\G\A and $B^T\G^T\A^T$ are known parameter matrices, V is an input transformation result matrix, U is a convolution kernel transformation result matrix, M is a to-be-outputted transformation matrix, and S is an output matrix.

It can be learned from the foregoing that, six matrix multiplications need to be performed in the foregoing three transformations, resulting in overheads of computing instructions, and exhausting computing resources, storage resources, and the like of an electronic device.

In addition, the multiplications performed on the input transformation result matrix V and the convolution kernel transformation result matrix U are defined as element-wise multiplications. The element-wise multiplication may be implemented by using a level-1 BLAS matrix operation, to reduce a computational volume. However, the level-1 BLAS matrix operation is essentially not suitable for an electronic device with a Von Neumann architecture. Therefore, although the computational volume may be reduced, computing efficiency is still low. Therefore, the advantage of reducing computational volume is offset due to its unsuitability, and the speedup is not much improved.

Therefore, the problem of low efficiency still remains in the image recognition method based on the convolutional neural network model.

In addition, acceleration through a dedicated hardware not only has high implementation costs, but also has no compatibility. A model compression has a very high compression ratio on the premise that calculation precision is ensured, but still cannot effectively improve a speedup.

Accordingly, embodiments of the disclosure specifically provides an efficient image recognition method. That is, an image recognition apparatus corresponding to the image recognition method that is applicable to an electronic device with a Von Neumann architecture, for example, a smartphone.

Figure 2:
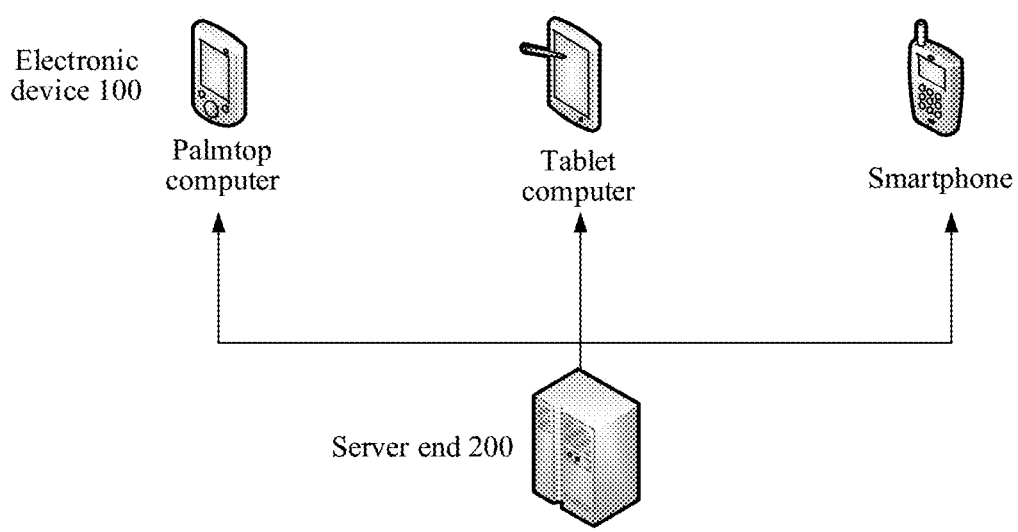
FIG. 2 is a schematic diagram of an implementation environment according to an embodiment.

FIG. 2 is a schematic diagram of an implementation environment of an image recognition method according to an embodiment. The implementation environment includes an electronic device 100 in which an image recognition apparatus is deployed, and a server end 200.

The electronic device 100 may be a tablet computer, a palmtop computer, a smartphone, an unmanned aerial vehicle, a robot, a portable smart device (such as smart glasses or a smart camera), or the like. However, it is not limited thereto.

The server end 200 establishes a communication connection to the electronic device 100 through a wireless network or a wired network, to implement data transmission with the electronic device 100 through the communication connection. For example, a transmitted data packet includes a convolutional neural network model stored in a file form. The server end 200 may be a server, or may be a server cluster including a plurality of servers or a cloud computing center including a plurality of servers, However, it is not limited thereto.

In the server end 200, a model training of a convolutional neural network model is performed by using a large quantity of training samples, and the convolutional neural network model obtained through the training is stored in a file form and delivered to the electronic device 100.

Through interactions between the electronic device 100 and the server end 200, the electronic device 100 receives the convolutional neural network model that is in the file form and that is delivered by the server end 200, and further performs image recognition by using the convolutional neural network model, to provide a user with intelligent image recognition services such as facial recognition, gesture recognition, text recognition, obstacle avoidance, and intelligent navigation.

Figure 3:
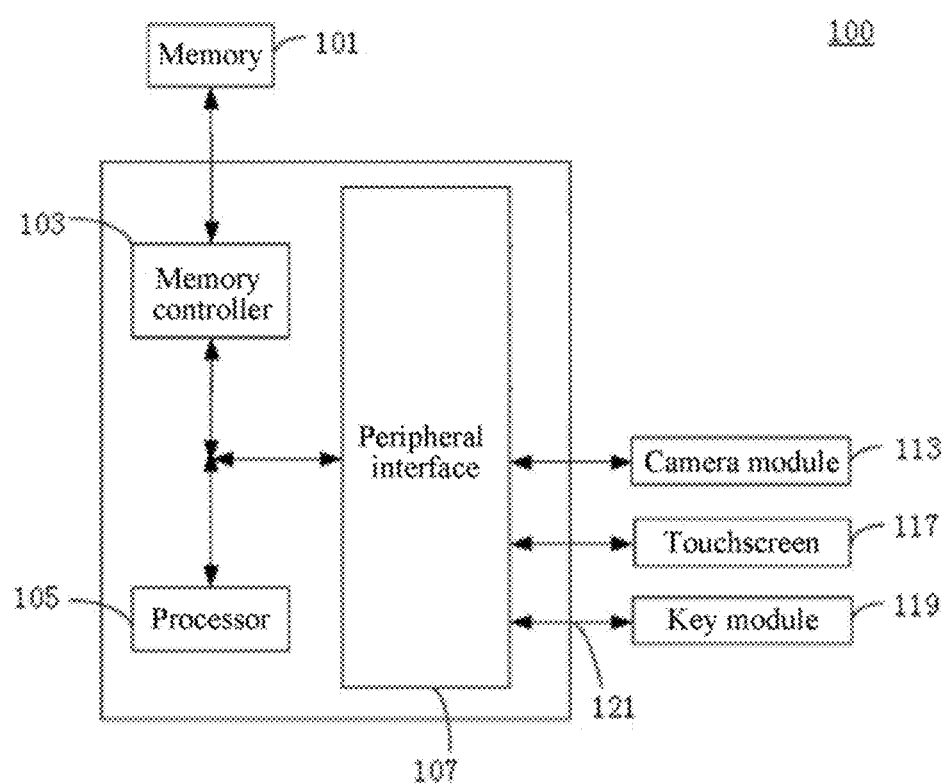
FIG. 3 is a block diagram of a hardware structure of an electronic device according to an embodiment.

FIG. 3 is a block diagram of a hardware structure of an electronic device according to an embodiment.

According to an embodiment, the electronic device 100 includes a memory 101, a storage controller 103, one or more processors 105, a peripheral interface 107, a camera module 113, a touchscreen 117, and a key module 119. The components communicate with each other through one or more communications buses/signal lines 121.

The memory 101 may be configured to store a computer program and a module, for example, a computer-readable instruction and module corresponding to the image recognition method and apparatus in the embodiments, and the processor 105 may be configured to perform various functions and data processing by running the computer-readable instruction stored in the memory 101, that is, performing the image recognition method.

The memory 101 is used as a carrier, that is, a storage medium, for resource storage, and may be a random memory such as a high-speed random access memory, a non-volatile memory such as one or more magnetic storage apparatuses, a flash memory, or another solid-state memory. The storage manner may be transient storage or permanent storage.

The peripheral interface 107 may include at least one wired or wireless network interface, and may be configured to couple various external input/output apparatuses to the memory 101 and the processor 105, to implement communication with the various external input/output apparatuses. For example, interaction between the electronic device 100 and the server end 200 shown in the implementation environment in FIG. 2 may be implemented based on a wired or wireless network interface.

The camera module 113 may include a camera, and may be configured to capture an image or a video. The captured image or video may be stored in the memory 101, or may be sent to the various external input/output apparatuses through the peripheral interface 107. For example, during facial recognition, a face of a user may be captured based on the camera module 113 to obtain a facial image.

The touchscreen 117 provides an input/output interface between the electronic device 100 and a user. Specifically, the user may perform an input operation by using the touchscreen 117, for example, a gesture operation such as a tap, a touch, and a slide, to cause the electronic device 100 to respond to the input operation. The electronic device 100 displays and outputs output content formed in any form of text, an image, or a video or a combination thereof to the user through the touchscreen 117. For example, the facial image captured by the camera module 113 may be displayed through the touchscreen 117.

The key module 119 includes at least one key, for providing an interface for the user to input information to the electronic device 100. The user may press different keys to enable the mobile terminal 100 to perform different functions. For example, during facial recognition, the electronic device 100 is controlled, based on the key module 119, to perform facial recognition.

It may be understood that the structure shown in FIG. 3 is only an example, and the image recognition apparatus may include more or fewer components than those shown in FIG. 3, or have components different from those shown in FIG. 3. The components shown in FIG. 3 may be implemented by using hardware, software, or a combination thereof.

Figure 4:
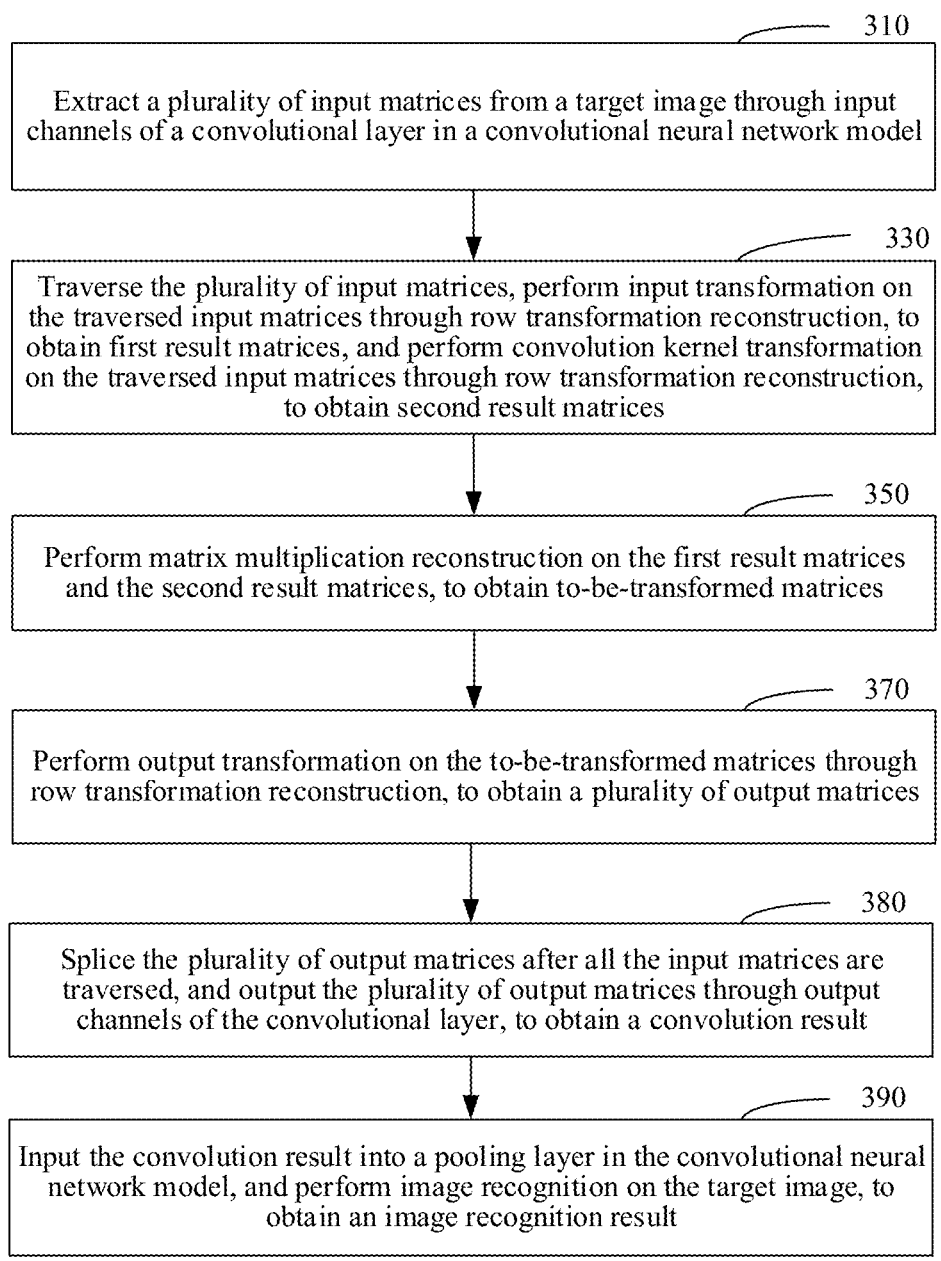
FIG. 4 is a flowchart of an image recognition method according to an embodiment.

FIG. 4 is a flowchart of an image recognition method according to an embodiment. Referring to FIG. 4, an image recognition method is performed by the electronic device 100 in the implementation environment shown in FIG. 2. A structure of the electronic device 100 may be as shown in FIG. 3.

The image recognition method may be performed by the electronic device, and may include the following steps.

In step 310, the electronic device 100 may extract a plurality of input matrices from a target image through input channels of a convolutional layer in a convolutional neural network model.

First, the convolutional neural network model is deployed in an electronic device for an image recognition, and may include a convolutional layer, a pooling layer, a fully-connected layer, and a loss layer.

An image recognition may include performing operations, such as inputting the target image into the convolutional layer for feature extraction, performing, by the fully-connected layer through feature compression of the pooling layer, connection for a feature outputted by the pooling layer, further inputting the feature into the loss layer, and finally outputting, by the loss layer by calculating a loss value of the loss layer, an image recognition result in a case that the loss value of the loss layer is minimum.

The target image may be a facial image, a gesture image, a text image, or the like. However, a type of target image is not limited thereto. For example, because different types of the target images may correspond to different application scenarios, for example, the facial image may correspond to a facial recognition scenario, the gesture image may correspond to a gesture recognition scenario, and the text image may correspond to a text recognition scenario, the image recognition method provided in this embodiment may be applicable to different application scenarios according to different types of the target images.

As described above, because a computational volume of the convolutional layer in the convolutional neural network model is large, and three transformations and one multiplication that are included in the Winograd F(2×2, 3×3) algorithm provided for the 3×3 convolution kernel result in six matrix multiplications and one element-wise multiplication that need to be performed in a single convolutional layer, computing efficiency of the convolutional neural network model may be degraded.

In this embodiment, through a plurality of row transformation reconstructions and one matrix multiplication reconstruction in the convolutional layer, a plurality of matrix multiplications and one element-wise multiplication may not be performed in the convolutional layer, so that the computational volume of the convolutional layer is greatly reduced, and computing efficiency of the convolutional neural network model is further improved. First, as shown in FIG. 1, an input matrix d is obtained.

In the convolutional neural network model, one convolutional layer may receive N images that carry C input channels and that have a size of H×W. Therefore, the obtaining the input matrix d is specifically extracting the input matrix d from N target images of the size of H×W through the C input channels of the convolutional layer.

In addition, an image is a two-dimensional matrix including a plurality of pixels. Therefore, an image size is based on the pixels in the image. For example, the target image of the size of H×W indicates that each row of the target image includes H pixels, and each column of the target image includes W pixels.

In an embodiment, the obtaining the input matrix d may include performing image segmentation on pixels in the target image, and outputting the segmented images through the plurality of input channels of the convolutional layer to obtain the input matrix d.

In step 330, the method may include traversing the plurality of input matrices, performing input transformation on the traversed input matrices through row transformation reconstruction to obtain first result matrices, and performing convolution kernel transformation on the traversed input matrices through row transformation reconstruction to obtain second result matrices.

After the plurality of input matrices are obtained, the plurality of input matrices may need to be traversed to perform input transformation and convolution kernel transformation on the traversed input matrices to obtain the corresponding first result matrices and the second result matrices.

The convolution kernel transformation may be implemented through a convolution kernel matrix corresponding to the input matrix, and the convolution kernel matrix may be generated during model training of the convolutional neural network model. That is, during the model training, corresponding convolution kernel matrices are trained by using training samples for the input matrices, and based on the trained convolution kernel matrices, correspondence between the input matrices and the convolution kernel matrices may be established accordingly for usage in subsequent image recognition. That is, the convolution kernel transformation performed on the input matrix is essentially performed for the convolution kernel matrix corresponding to the input matrix.

In this embodiment, input transformation performed on the input matrices and convolution kernel transformation performed on the input matrices are implemented through row transformation reconstruction to reduce overheads of computing instructions in the foregoing transformations.

Specifically, the first result matrices are obtained by performing row transformation on the input matrices by using an input parameter matrix, and the second result matrices are obtained by performing row transformation on the convolution kernel matrices by using a convolution parameter matrix.

The input parameter matrix and the convolution parameter matrix are obtained through a known parameter matrix $B\backslash G\backslash B^T\backslash G^T$, and are also configured as known parameter matrices. The first result matrices are obtained by transforming input transformation result matrices, and the second result matrices are obtained by transforming convolution kernel transformation result matrices.

Specifically, the input parameter matrix is $B^T$, the convolution parameter matrix is $G$, the first result matrix is $V^T$, that is, a transpose of the input transformation result matrix, and the second result matrix is $U^T$, that is, a transpose of the convolution kernel transformation result matrix.

Therefore, the plurality of matrix multiplications in the input transformation and the convolution kernel transformation may be transformed into row transformation performed on the input matrices and the convolution kernel matrices, to prevent relatively high overheads of computing instructions in the input transformation and the convolution kernel transformation, thereby helping to improve computing efficiency of the convolutional neural network model.

In step 350, the method may include performing matrix multiplication reconstruction on the first result matrices and the second result matrices to obtain to-be-transformed matrices.

As described above, the element-wise multiplications performed on the input transformation result matrix and the convolution kernel transformation result matrix are level-1 BLAS matrix operations, and are inapplicable to an electronic device with a Von Neumann architecture, resulting in low computing efficiency.

Accordingly, in this embodiment, for the first result matrices related to the input transformation result matrices and the second result matrices related to the convolution kernel transformation result matrices, the element-wise multiplication may be reconstructed into matrix multiplication, so that the level-1 BLAS matrix operations are transformed into level-3 BLAS matrix operations, thereby greatly improving computing efficiency. In addition, the level-3 BLAS matrix operations are more applicable to the electronic device with a Von Neumann architecture, thereby further improving compatibility of the image recognition method.

In step 370, the method may include performing output transformation on the to-be-transformed matrices through row transformation reconstruction to obtain a plurality of output matrices.

As described above, the plurality of matrix multiplications in output transformation cause high overheads of computing instructions, and exhaust computing resources, storage resources, and the like of the electronic device.

Therefore, in this embodiment, the output transformation performed on the to-be-transformed matrices is implemented through the row transformation reconstruction.

Specifically, the output matrices are obtained by performing row transformation on the to-be-transformed matrix by using an output parameter matrix.

The output parameter matrix is obtained through a known parameter matrix A\A$^T$, and is also considered as a known parameter matrix. The to-be-transformed matrices are obtained by transforming to-be-outputted transformation matrices.

Specifically, the output parameter matrix is A$^T$, and the to-be-transformed matrix is M$^T$, that is, a transpose of the to-be-outputted transformation matrix.

Therefore, the plurality of matrix multiplications in output transformation are transformed into row transformation performed on the output matrices, thereby preventing relatively high overheads of computing instructions in the output transformation, and further improving computing efficiency of the convolutional neural network model.

Corresponding output matrices are obtained after the input transformation, the convolution kernel transformation, and the output transformation are performed on the input matrices.

In step 380, the method may include splicing the plurality of output matrices after all the input matrices are traversed, and output the plurality of output matrices through output channels of the convolutional layer to obtain a convolution result.

As described above, the plurality of input matrices are obtained by performing image segmentation on the target image, and the convolution result is obtained by splicing the plurality of output matrices.

Each output matrix corresponds to an input matrix.

In step 390, the method may include inputting the convolution result into a pooling layer in the convolutional neural network model, and performing image recognition on the target image to obtain an image recognition result.

After the convolution result is obtained, subsequent image recognition is performed on the target image.

Figure 5:
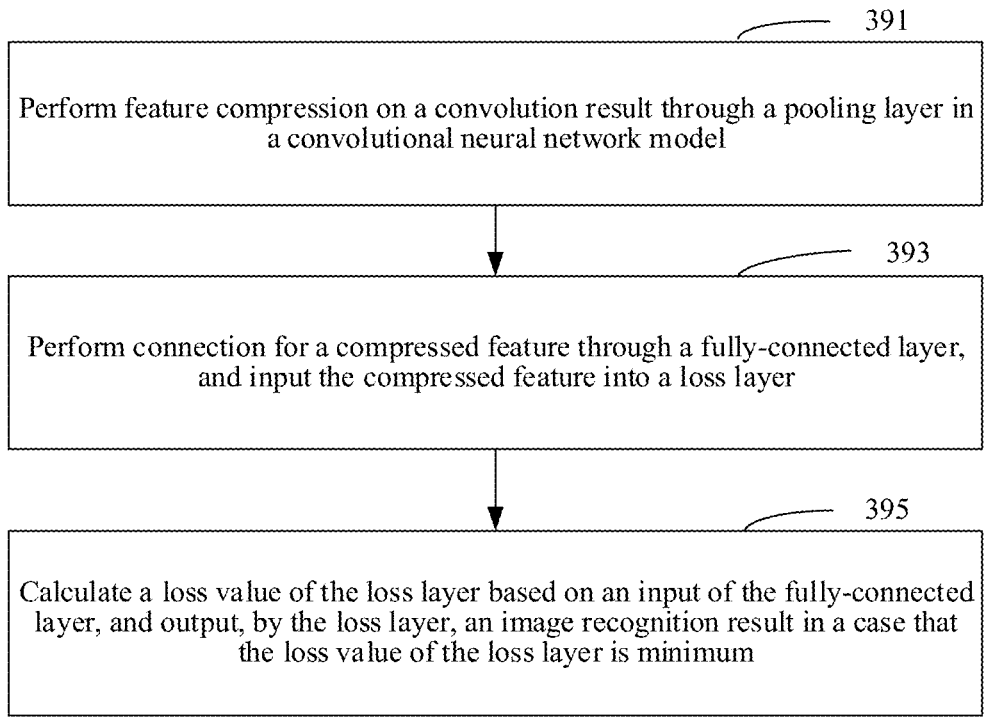
FIG. 5 is a detailed flowchart of step 390 in FIG. 4 according to an embodiment.

FIG. 5 is a flowchart further describing the step 390 in FIG. 4 according nto an embodiment. Specifically, as shown in steps 391 to 395 in FIG. 5, the convolution result is considered as a feature extracted after the target image is inputted into the convolutional layer. The fully-connected layer performs, through feature compression of the pooling layer, connection for a feature outputted by the pooling layer, and further inputs the feature into the loss layer. Subsequently, the loss layer can output, by calculating a loss value of the loss layer, an image recognition result in a case that the loss value of the loss layer is minimum.

It may be understood that, the convolution result only describes a local feature of the target image, the subsequent output of the fully-connected layer is used for describing a global feature of the target image. Accordingly, a final image recognition result is obtained based on the global feature, and the image recognition on the target image may be obtained.

Through the foregoing procedure, the plurality of matrix multiplications and one element-wise multiplication do not need to be performed in the convolutional layer, and are replaced by a plurality of row transformations and one matrix multiplication. In this way, a computational volume of the convolutional layer is greatly reduced, computing efficiency of the convolutional neural network model is effectively improved, and therefore, the efficiency of image recognition may be improved.

Figure 6:
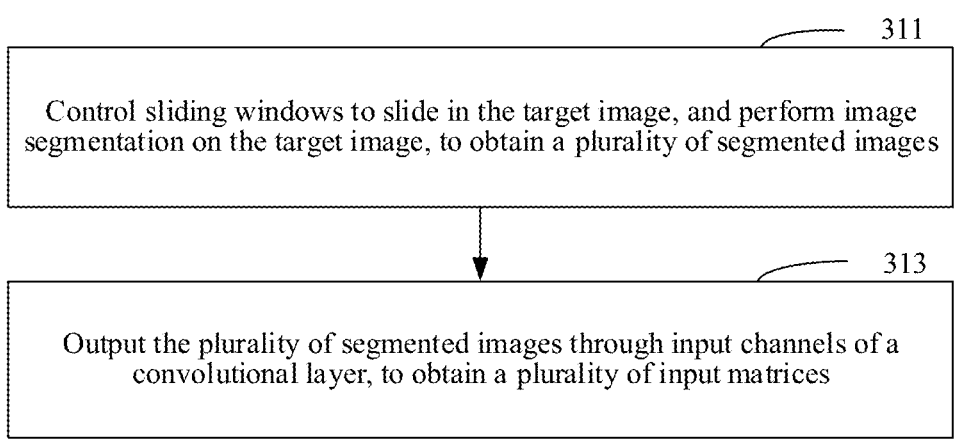
FIG. 6 is a detailed flowchart of step 310 in FIG. 4 according to an embodiment.

FIG. 6 is a flowchart further describing the step 310 in FIG. 4 according to an embodiment and may include the following steps.

In step 311, the method may include controlling sliding windows to slide in the target image, and performing image segmentation on the target image to obtain a plurality of segmented images.

Each segmented image corresponds to a sliding location of the sliding window in a case that the sliding windows slide in the target image.

In step 313, the method may include outputting the plurality of segmented images through the input channels of the convolutional layer to obtain the plurality of input matrices.

Each input matrix corresponds to one segmented image and a size of each input matrix is equal to a specified size of the sliding window.

In this embodiment, implementation of the image segmentation relies on the sliding window. The specified size and a specified sliding distance of the sliding window may both be flexibly set according to different application scenarios, and are not limited herein.

In an embodiment, the specified size of the sliding window may be 4×4 to adapt to the Winograd F(2×2, 3×3) algorithm.

The specified sliding distance of the sliding window being 2 indicates that a distance of each slide of the sliding window includes two elements (e.g., pixels) in a row.

Figure 7:
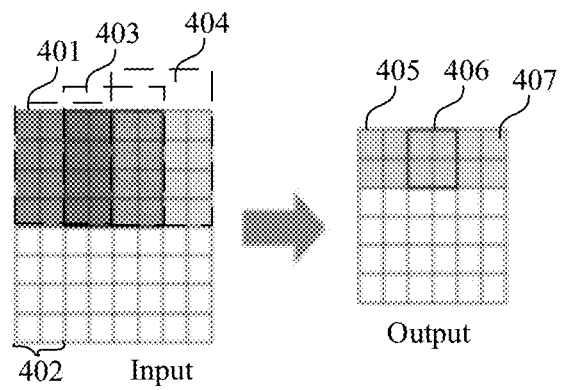
FIG. 7 is a schematic diagram of sliding of a sliding window according to an embodiment.

As shown in FIG. 7, a specified size 401 of the sliding window is 4×4, and a specified sliding distance 402 includes two elements. As the sliding window slides in a target image input, pixels in the target image input are segmented into several segmented images (such as 401, 403, and 404), and 4×4 pixels are included in each segmented image.

If the sliding window moves to an edge location of the target image, and pixels included in the target image at the edge location are insufficient to fill the sliding window, a blank image may be used to fill the unfilled sliding window. That is, filling may be performed by using pixels of which a pixel value is 0.

Therefore, for the target image of the size of H×W, a quantity of input transformations is reduced from H×W to (H−2)(W−2)/2×2, to reduce the computational volume, and to further improve computing efficiency of the convolutional neural network model.

According to an embodiment, step 380 may include the following step. The method may include splicing the plurality of output matrices according to the sliding locations of the sliding windows in a case that the sliding windows slide in the target image, and outputting the plurality of output matrices through the output channels of the convolutional layer to obtain the convolution result.

That is, the splicing of the convolution result corresponds to the image segmentation performed by the sliding window. That is, for each output matrix, a splicing location of the output matrix in the convolution result may be a sliding location of a sliding window corresponding to the segmented image in a case that the sliding windows slide in the target image. The segmented image corresponds to an input matrix corresponding to the output matrix.

As shown in FIG. 7, for the segmented images 401, 403, and 404, splicing locations of the output matrices in a convolution result output are respectively 405, 406, and 407.

According to the foregoing embodiment, the image segmentation of the target image and splicing of the convolution result are implemented, and further, learning of local features of the target image by the convolutional layer may be fully implemented.

Figure 8:
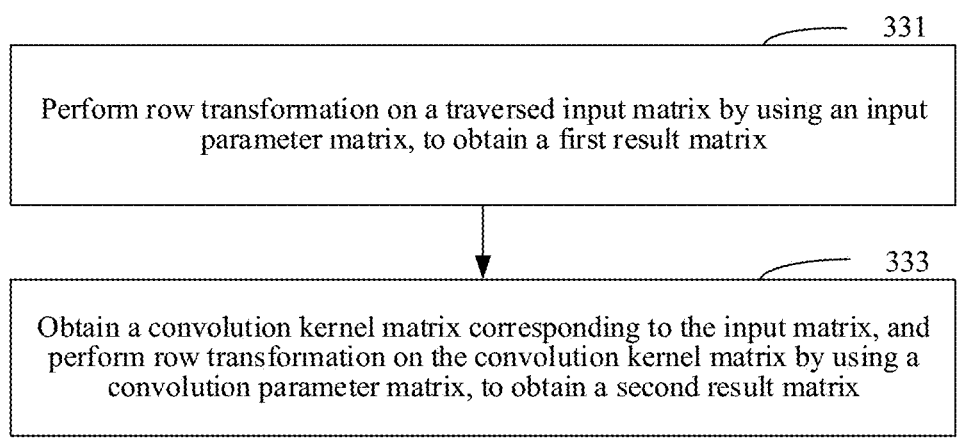
FIG. 8 is a detailed flowchart of step 330 in FIG. 4 according to an embodiment.

FIG. 8 is a flowchart further describing the step 330 in FIG. 4 according to an embodiment and may include the following steps.

In step 331, the method may include performing row transformation on the traversed input matrix by using an input parameter matrix to obtain the first result matrix.

The input transformation may be performed by using the following computing formulas:

$$V = B^T dB \quad (1)$$

$$B^T = \begin{bmatrix} 1 & 0 & -1 & 0 \\ 0 & 1 & 1 & 0 \\ 0 & -1 & 1 & 0 \\ 0 & 1 & 0 & -1 \end{bmatrix} \quad (2)$$

where d is an input matrix, and B and $B^T$ are known parameter matrices.

In step 333, the method may include obtaining a convolution kernel matrix corresponding to the input matrix, and performing row transformation on the convolution kernel matrix by using a convolution parameter matrix to obtain the second result matrix.

The convolution kernel transformation may be performed by using the following computing formulas:

$$U = GgG^T \quad (2)$$

$$G = \begin{bmatrix} 1 & 0 & 0 \\ 1/2 & 1/2 & 1/2 \\ 1/2 & -1/2 & 1/2 \\ 0 & 0 & 1 \end{bmatrix} \quad (2.1)$$

where g is a convolution kernel matrix corresponding to an input matrix d, and G and $G^T$ are known parameter matrices.

It can be learned from the above embodiments that, regardless of for the input transformation or the convolution kernel transformation, an element of which a value is zero may be included in all the known parameter matrices. Here, even if calculation is performed according to a general matrix multiplication, overheads of computing instructions in the foregoing transformations may be reduced, which is advantageous to improving computing efficiency of the convolutional neural network model.

Therefore, only necessary calculations in the foregoing transformations are performed through the row transformation reconstruction, that is, only elements of which a value is not zero are calculated to reduce overheads of the computing instructions.

The input transformation is used as an example for description, and the formula (1) may be reconstructed into a formula (5):

$$V^T = B^T(B^T d)^T \quad (5)$$

where $V^T$ is a first result matrix, $B^T$ is an input parameter matrix, and d is an input matrix.

Therefore, in the input transformation, the original left-multiplying the input matrix d by a known parameter matrix $B^T$ and right-multiplying the input matrix d by a known parameter matrix B may be reconstructed into left-multiplying the input matrix d by the input parameter matrix $B^T$ twice, thereby further implementing that only elements of which a value is not zero in the input parameter matrix $B^T$ participate in the row transformation on the input matrix d.

Similarly, for the convolution kernel transformation, the formula (2) may be reconstructed into a formula (6):

$$U^T = G(Gg)^T \quad (6)$$

where $U^T$ is a second result matrix, G is a convolution parameter matrix, and g is a convolution kernel matrix.

In the convolution kernel transformation, the original left-multiplying the convolution kernel matrix g by a known parameter matrix G and right-multiplying the convolution kernel matrix g by a known parameter matrix $G^T$ may be reconstructed into left-multiplying the convolution kernel matrix g by the convolution parameter matrix G twice, thereby further implementing that only elements of which a value is not zero in the convolution parameter matrix G participate in the row transformation on the convolution kernel matrix g.

Correspondingly, in an embodiment, step 370 may include performing row transformation on the to-be-transformed matrix by using an output parameter matrix to obtain the output matrix.

The output transformation may be performed by using the following computing formulas:

$$S = A^T MA \quad (4)$$

$$A^T = \begin{bmatrix} 1 & 1 & 1 & 0 \\ 0 & 1 & -1 & -1 \end{bmatrix} \quad (4.1)$$

where S is an output matrix, and A and $A^T$ are known parameter matrices.

It can be learned from the above embodiments that, for the output transformation, an element of which a value is zero may be also included in the known parameter matrix. Even if calculation is performed according to a general matrix multiplication, overheads of computing instructions in the foregoing transformations may be reduced, which is advantageous to improving computing efficiency of the convolutional neural network model.

Therefore, only necessary calculations in the output transformation are performed through the row transformation reconstruction, that is, only elements of which a value is not zero are calculated, to reduce overheads of the computing instructions.

In addition, the formula (4) may be reconstructed into a formula (7):

$$S = A^T(A^T M^T)^T \quad (7)$$

where $M^T$ is a to-be-transformed matrix, $A_T$ is an output parameter matrix, and S is an output matrix.

In the output transformation, the original left-multiplying the to-be-outputted transformation matrix M by a known parameter matrix $A^T$ and right-multiplying the to-be-outputted transformation matrix M by a known parameter matrix A may be reconstructed into left-multiplying the to-be-transformed matrix $M^T$ by the output parameter matrix $A^T$ twice, thereby further implementing that only elements of which a value is not zero in the output parameter matrix $A^T$ participate in the row transformation of the to-be-transformed matrix $M^T$.

In addition, in the foregoing row transformation reconstruction procedure, the first result matrix $V^T$ is a transpose of the input transformation result matrix V, and the second result matrix $U^T$ is a transpose of the convolution kernel transformation result matrix U. After the output transformation is performed, the output result is still the output matrix S rather than a transpose ST of the output matrix S.

That is, although the first result matrix and the second result matrix are respectively the transpose of the input transformation result matrix and the transpose of the convolution kernel transformation, before the output transformation is performed, reverse transpose does not need to be performed on the first result matrix and the second result matrix, and the original output result, that is, the output matrix S, is still outputted and obtained.

Accordingly, in the foregoing row transformation reconstruction procedure, before the output transformation is performed, a reverse transpose does not need to be performed on the first result matrix and the second result matrix.

For example, first, the formula (3) is introduced to the formula (7) to obtain a constantly satisfied formula (8) as follows:

$$S=A^T(A^TM^T)^T=A_T(A^T(U\odot V)^T)^T \quad (8)$$

It may be understood that, in the element-wise multiplication, $(U\odot V)^T=(U^T\odot V^T)$, the formula (8) may be further transformed into a formula (9):

$$S=A^T(A^T(U\odot V^T)) \quad (9)$$

where $U^T$ is a first result matrix, $V^T$ is a second result matrix, and $U^T\odot V^T$ is a to-be-transformed matrix $M^T$.

It can be learned from the above that, the output matrix is obtained by performing row transformation reconstruction on the to-be-transformed matrix $M^T$. Therefore, before the output transformation, reverse transpose does not need to be performed on the first result matrix $V^T$ and the second result matrix $U^T$.

In the foregoing procedure, right-multiplying a matrix in the convolutional layer may be transformed into left-multiplying a matrix, thereby further implementing that only elements of which a value is not zero in the known parameter matrices participate in the row transformation reconstruction procedure.

It may be understood that, in the foregoing row transformation reconstruction procedure, principles of the row transformation reconstruction are the same, and differences are only a difference between input objects, a difference between output objects, and a difference between the used known parameter matrices. Before the row transformation reconstruction procedure is further described in detail, the following descriptions are provided for describing differences between the foregoing various transformations to help better understand the commonality of the various transformations in the row transformation reconstruction procedure.

A reconstruction parameter matrix includes the input parameter matrix, the convolution parameter matrix, or the output parameter matrix.

A reconstruction input matrix includes the input matrix, the convolution kernel matrix corresponding to the input matrix, or the to-be-transformed matrix.

A reconstruction output matrix includes the first result matrix, the second result matrix, or the output matrix.

Figure 9:
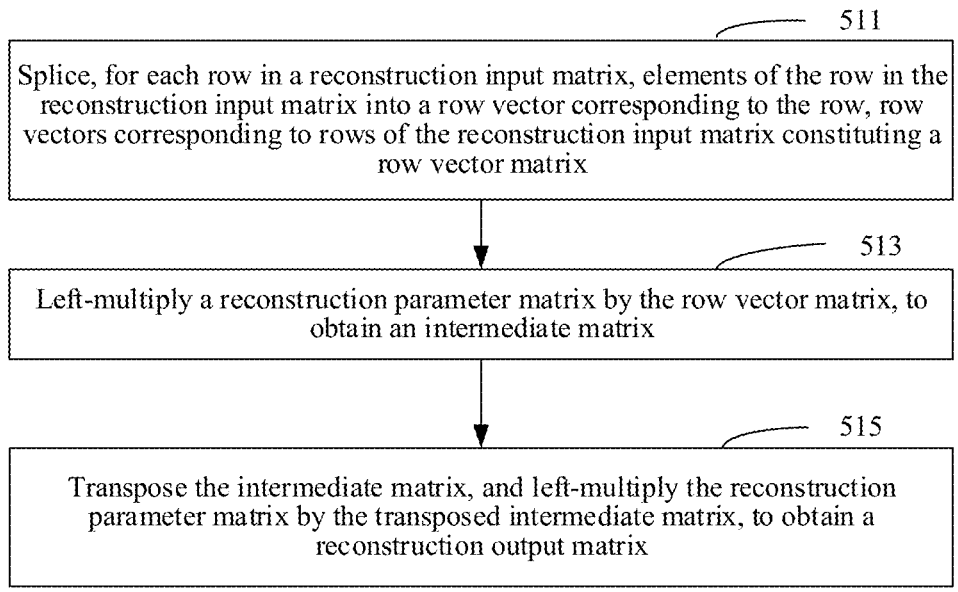
FIG. 9 is a flowchart of a method of a row transformation reconstruction procedure according to an embodiment.

In an embodiment, as shown in FIG. 9, the row transformation reconstruction procedure, that is, performing row transformation on the reconstruction input matrix through the reconstruction parameter matrix to obtain the reconstruction output matrix, may include the following steps:

In step 511, the method may include splicing, for each row in the reconstruction input matrix, elements of the row in the reconstruction input matrix into a row vector corresponding to the row, row vectors corresponding to rows of the reconstruction input matrix constituting a row vector matrix.

In step 513, the method may include left-multiplying the reconstruction parameter matrix by the row vector matrix to obtain an intermediate matrix.

In step 515, the method may include transposing the intermediate matrix, and left-multiplying the reconstruction parameter matrix by the transposed intermediate matrix to obtain the reconstruction output matrix.

For example, assuming that the reconstruction input matrix is X, the reconstruction parameter matrix is Y, the reconstruction output matrix is Z, and the intermediate matrix is W, $Z=Y(YX)^T=YW^T$.

where, $$X = \begin{vmatrix} x0 & x1 & x2 & x3 \\ x4 & x5 & x6 & x7 \\ x8 & x9 & x10 & x11 \\ x12 & x13 & x14 & x15 \end{vmatrix}, \text{ and } Y = \begin{vmatrix} 1 & 0 & -1 & 0 \\ 0 & 1 & 1 & 0 \\ 0 & -1 & 1 & 0 \\ 0 & 1 & 0 & -1 \end{vmatrix}.$$

Row vectors vD0, vD1, vD2, and vD3 may correspond to rows that are configured for rows of the reconstruction input matrix X.

The rows in the reconstruction input matrix X may be stored to the corresponding row vectors, and further constitute the row vector matrix.

For example, vD0={x0, x1x2, x3}, vD1={x4, x5, x6, x7}, and so on.

A manner of splicing and storing elements of rows in the reconstruction input matrix X may be performed in descending order as described in this embodiment, or in ascending order or according to a specified rule. However, the manner is not limited to this embodiment.

Herein, that is, implementing row vector representation of the reconstruction input matrix X may alternatively be understood as that the row vector matrix is a precise representation of a corresponding row in the reconstruction input matrix X. If an element of a row of the reconstruction input matrix is different, a corresponding row vector may be different, and a constituted row vector matrix may also be different.

After the row vector matrix of the reconstruction input matrix X is obtained, the row transformation may be performed on the reconstruction input matrix X based on the row vector matrix.

Specifically, $$W = \begin{vmatrix} vW0 \\ vW1 \\ vW2 \\ vW3 \end{vmatrix} = Y \times X = \begin{vmatrix} 1 & 0 & -1 & 0 \\ 0 & 1 & 1 & 0 \\ 0 & -1 & 1 & 0 \\ 0 & 1 & 0 & -1 \end{vmatrix} \times \begin{vmatrix} vD0 \\ vD1 \\ vD2 \\ vD3 \end{vmatrix} = \begin{vmatrix} vD0 - vD2 \\ vD1 + vD2 \\ vD2 - vD1 \\ vD1 - vD3 \end{vmatrix},$$

$$\text{and } Z = YW^T = \begin{vmatrix} 1 & 0 & -1 & 0 \\ 0 & 1 & 1 & 0 \\ 0 & -1 & 1 & 0 \\ 0 & 1 & 0 & -1 \end{vmatrix} \times \begin{vmatrix} vW0 \\ vW1 \\ vW2 \\ vW3 \end{vmatrix}^T = \begin{vmatrix} vW0^T - vW2^T \\ vW1^T + vW2^T \\ vW2^T - vW1^T \\ vW1^T - vW3^T \end{vmatrix}.$$

Through the foregoing procedure, the plurality of matrix multiplications that consumes a relatively large quantity of computing instructions is replaced by efficient and compact row transformation instructions, thereby greatly reducing a computational volume, and effectively improving computing efficiency of the convolutional neural network model.

Figure 10:
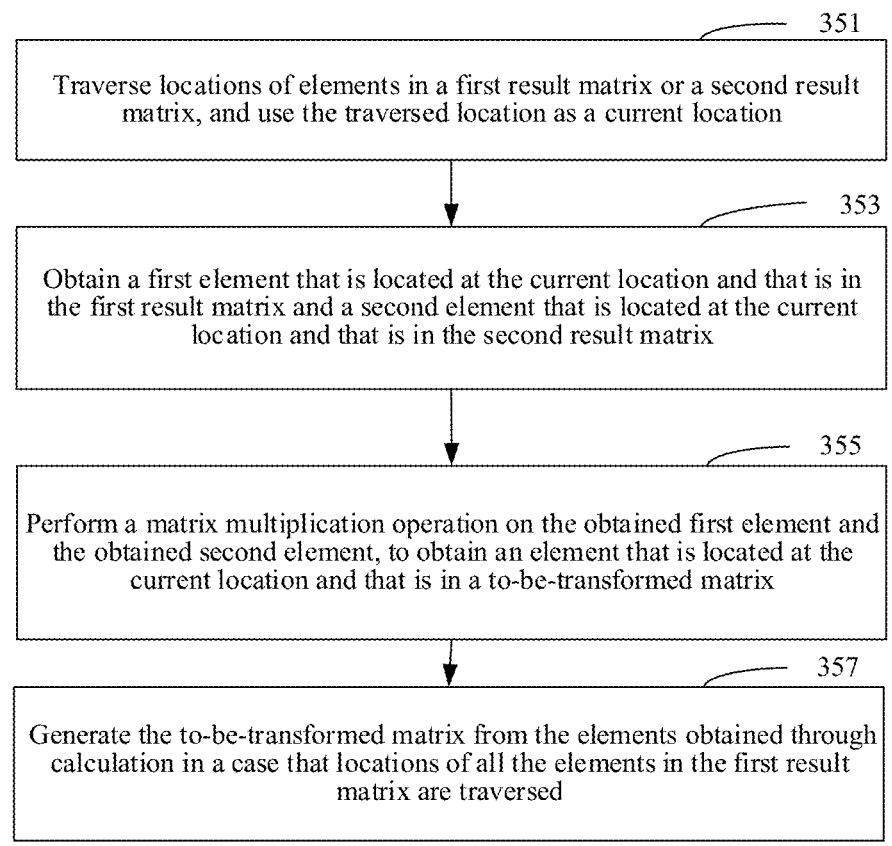
FIG. 10 is a detailed flowchart of step 350 in FIG. 4 according to an embodiment.
Figure 11:
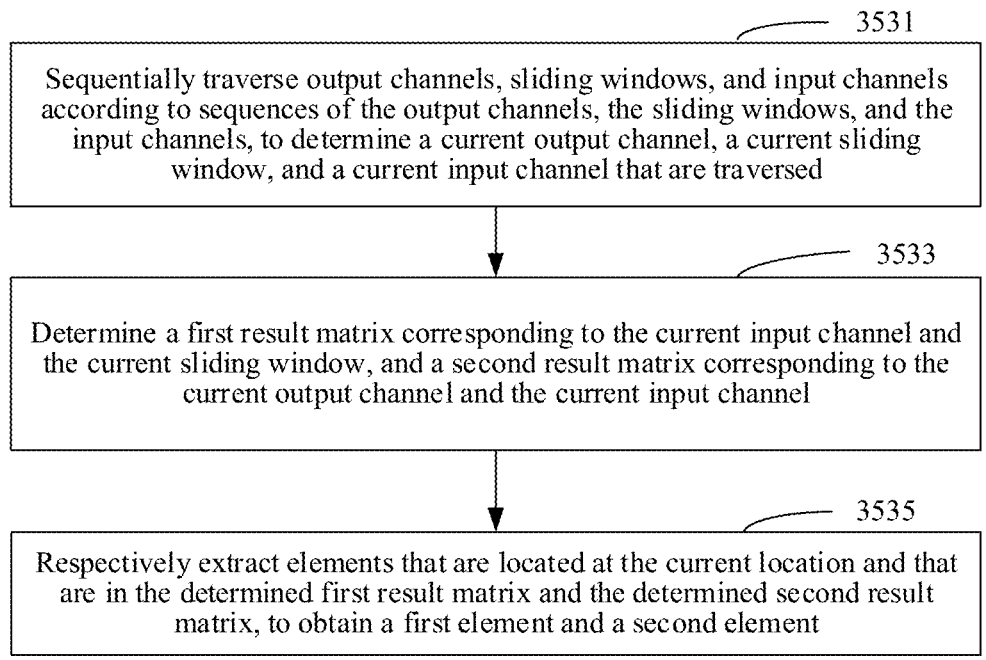
FIG. 11 is a detailed flowchart of step 353 in FIG. 10 according to an embodiment.

FIG. 10 is a flowchart further describing the step 350 in FIG. 4 according to an embodiment and may include the following steps.

In step 351, the method may include traversing locations of elements in the first result matrix or the second result matrix, and using the traversed location as a current location.

In step 353, the method may include obtaining a first element that is located at the current location and that is in the first result matrix, and a second element that is located at the current location and that is in the second result matrix.

FIG. 10 is a flowchart further describing the step 353 in FIG. 10 according to an embodiment and may include the following steps.

In step 3531, the method may include sequentially traversing the output channels, the sliding windows, and the input channels according to sequences of the output channels, the sliding windows, and the input channels, to determine a current output channel, a current sliding window, and a current input channel that are traversed.

In step 3533, the method may include determining the first result matrix corresponding to the current input channel and the current sliding window, and the second result matrix corresponding to the current output channel and the current input channel.

In step 3535, the method may include, respectively extracting elements that are located at the current location and that are in the determined first result matrix and the determined second result matrix to obtain the first element and the second element.

Referring to FIG. 10, in step 355, the method may include performing a matrix multiplication operation on the obtained first element and the obtained second element to obtain an element that is located at the current location and that is in the to-be-transformed matrix.

Figure 12:
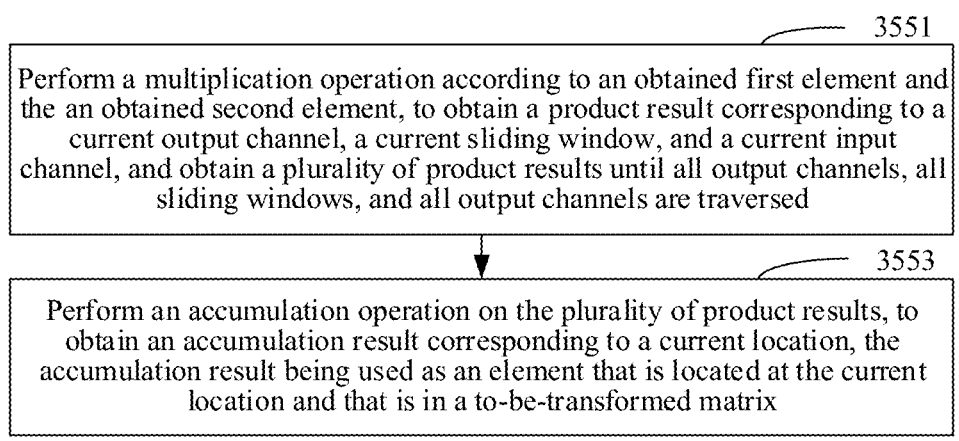
FIG. 12 is a detailed flowchart of step 355 in FIG. 10 according to an embodiment.

In an embodiment, as shown in FIG. 12, step 355 may further include the following steps.

In step 3551, the method may include performing a multiplication operation according to the obtained first element and the obtained second element to obtain a product result corresponding to the current output channel, the current sliding window, and the current input channel, and iteratively obtain a plurality of product results until all the output channels, all the sliding windows, and all the output channels are traversed.

In step 3553, the method may include performing an accumulation operation on the plurality of product results to obtain an accumulation result corresponding to the current location, the accumulation result being used as the element that is located at the current location and that is in the to-be-transformed matrix.

It is to be understood that, when the matrix multiplication operation is performed on the first result matrix and the second result matrix, and when traversal is performed for a quantity of the elements, a quantity of the output channels, a quantity of the sliding windows, and a quantity of the input channels, the traversal is usually sequentially performed according to sequences of the output channels, the sliding windows, the input channels, and the elements. Assuming that the quantity of the output channels is K, the quantity of the input channels is C, the quantity of the sliding windows is H×W, and the quantity of the elements is 16, then a volume of multiplication in the matrix multiplication operation is K×C×C×H×W×16.

In this embodiment, through the matrix multiplication reconstruction, when the traversal is performed for the quantity of the elements, the quantity of the output channels, the quantity of the sliding windows, and the quantity of the input channels, the traversal is sequentially performed according to a sequence of the elements, the output channels, the sliding windows, and the input channels, so that a volume of multiplication in the reconstructed matrix multiplication operation is greatly reduced to $4 \times K \times C \times (H-2) \times (W-2)$, so that the theoretical speedup of 2.25 of the Winograd F(2×2, 3×3) algorithm can be reached.

In step 357, the method may include generating the to-be-transformed matrix from the elements obtained through calculation in a case that locations of all the elements in the first result matrix are traversed.

Figure 13:
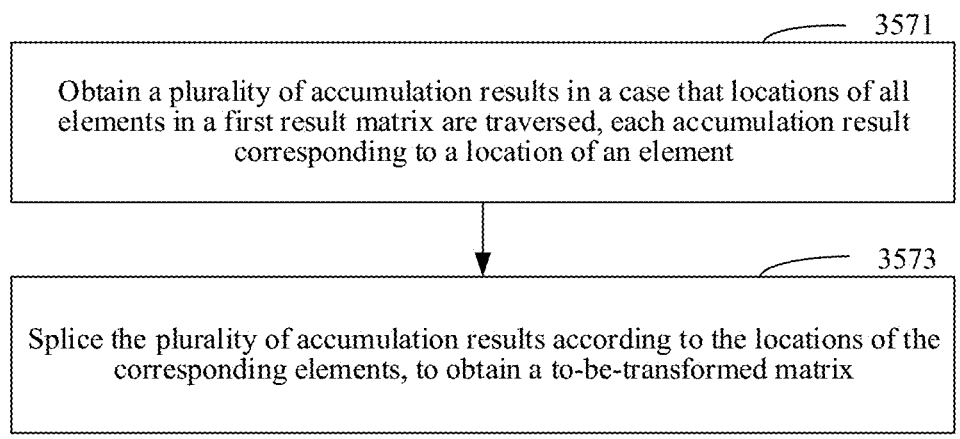
FIG. 13 is a detailed flowchart of step 357 in FIG. 10 according to an embodiment.

In an embodiment, as shown in FIG. 13, step 357 may further include the following steps.

In step 3571, the method may include obtaining a plurality of accumulation results in a case that the locations of all the elements in the first result matrix are traversed, each accumulation result corresponding to a location of an element.

In step 3573, the method may include splicing the plurality of accumulation results according to the locations of the corresponding elements to obtain the to-be-transformed matrix.

The foregoing matrix multiplication reconstruction procedure is described below in detail with reference to formulas.

The formula (9) may be represented as a formula (10) in detail according to the output channels, the sliding windows, and the input channels:

$$S = A^T (A^T [\Sigma_{c=0}^{C} U_{k,c}^T \odot V_{c,e}^T]) \quad (10)$$

where k represents an output channel, e represents a sliding window, and c represents an input channel.

Specifically, the to-be-transformed matrix may be determined based on the following formula (11):

$$M^T = [\Sigma_{c=0}^{C} U_{k,c}^T \odot V_{c,e}^T] \quad (11).$$

It may be learned from the formula (11) that, for the to-be-transformed matrices, element-wise multiplication and element-wise addition are respectively performed on elements that are at the same location and that are in the first result matrix and the second result matrix based on different input channels, different sliding windows, and different output channels. The operations of the multiplication and the addition essentially satisfy a definition of the matrix multiplication exactly, that is, the element in the to-be-transformed matrix may be defined as a formula (12):

$$M_{k,c,e}^T = \Sigma_{c=0}^{C} \Sigma_{k=0}^{K} \Sigma_{e=0}^{E} U_{k,c}^T \times K_{c,e}^T \quad (12)$$

where k represents an output channel, e represents a sliding window, and c represents an input channel, and correspondingly, K represents a quantity of output channels, E represents a quantity of sliding windows, and C represents a quantity of input channels.

Therefore, the element $M_{k,c,e}^T$ in the to-be-transformed matrix may be calculated and obtained according to the formula (12), and elements in rows constituting the to-be-transformed matrix $M^T$ are obtained through element traversal, and further, the to-be-transformed matrix $M^T$ is obtained by performing splicing according to element locations.

Calculating an element $m_{11}$ in the first row and the first column of the to-be-transformed matrix $M^T$ is used as an example for description. For example, the element $m_{11}$ may be determined based on the following steps.

(1) Determine a first result matrix $V_{0,0}^T$ and a second result matrix $U_{0,0}^T$ corresponding to an output channel k=0, a sliding window e=0, and an input channel c=0.

(2) Extract an element in a first row and a first column of the first result matrix $V_{0,0}^T$ and an element in a first row and a first column of the second result matrix $U_{0,0}^T$ to perform a multiplication operation, to obtain a product result corresponding to the output channel k=0, the sliding window e=0, and the input channel c=0.

(3) Traverse input channels in a sequence of c=0-→c=C, to obtain product results corresponding to the output channel k=0, the sliding window e=0, and the input channel c=1-→c=C.

By analogy, after all the input channels are traversed, the sliding windows are traversed in a sequence of e=0-→e=E, and after all the sliding windows are traversed, the output channels are traversed in a sequence of k=0-→k=K. A plurality of product results corresponding to different output channels (k=0-→k=K), different sliding windows (e=0-→e=E), and different input channels (c=0-→c=C) may be obtained until all the output channels are traversed.

(4) Perform an accumulation operation on the plurality of product results to obtain an accumulation result corresponding to a location in a first row and a first column, which is considered as the element $m_{11}$ in the first row and the first column of the to-be-transformed matrix $M^T$.

Therefore, after the element $m_{11}$ in the first row and the first column of the to-be-transformed matrix $M^T$ is obtained, element traversal is performed, that is, calculating an element $m_{12}$ in the first row and the second column of the to-be-transformed matrix $M^T$, and so on. The to-be-transformed matrix $M^T$ may be obtained by performing splicing according to the locations of the elements until all the elements are calculated.

In the foregoing procedure, the two independent calculation operations, that is, the element-wise multiplication and the element-wise addition, are transformed into independent matrix multiplications corresponding to different elements. The matrix multiplication may be implemented by using the matrix operation of the level-3 BLAS, which effectively reduces the computational volume, and is more applicable to the electronic device with a Von Neumann architecture. As a result, for the volume of multiplication, the Winograd F(2×2, 3×3) algorithm may reach the theoretical speedup of 2.25 at most, so that computing efficiency of the convolutional neural network model is greatly improved.

In addition, for hardware resources, registers may be disposed to store the plurality of product results, and further, the accumulation operation of the plurality of product results may be performed by reading values in the registers, as shown in this embodiment. According to an embodiment, only two registers may be disposed to reduce consumption of the hardware resources. One register may be configured to store a current product result, and another register may be configured to store a previous product result. Further, the two product results may be added by reading the values in the registers. When the next product result is calculated and obtained, the values in the two registers may be updated, that is, the current product result is updated to the register storing the previous product result, and the next product result is updated to the register storing the current product result. Further, the accumulation operation is performed based on the values in the registers in which the values are updated to accumulate the plurality of the product results. However, the registers are not limited to this embodiment, and may be variously configured according to various hardware resources in different application scenarios.

Figure 14:
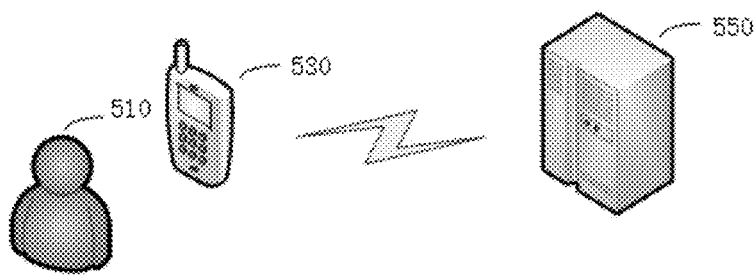
FIG. 14 is a schematic diagram of a specific implementation of an image recognition method in an application scenario according to an embodiment.

FIG. 14 is a schematic diagram of a scenario of an image recognition method in an application scenario according to an embodiment. As shown in FIG. 14, the application scenario may include a user 510, a smartphone 530, and a payment server 550. A convolutional neural network model may be deployed in the smartphone 530 to provide the user 510 with an intelligent facial recognition service.

For example, for a to-be-paid order, the user 510 performs face swiping through a camera configured in the smartphone 530, so that the smartphone 530 obtains a target image corresponding to the user 510, and facial recognition is further performed on the target image by using the convolutional neural network model deployed in the smartphone 530.

Specifically, in the convolutional neural network model, a plurality of input matrices may be extracted from the target image through input channels of a convolutional layer. The plurality of input matrices may be traversed, and input transformation and convolution kernel transformation may be performed on the traversed input matrices to respectively obtain first result matrices and second result matrices. A matrix multiplication reconstruction may be further performed on the first result matrices and the second result matrices to obtain to-be-transformed matrices, and then output transformation may be performed on the to-be-transformed matrices through row transformation reconstruction to obtain a plurality of output matrices. When all the input matrices are traversed, a convolution result obtained by splicing the plurality of output matrices may be inputted into a pooling layer in the convolutional neural network model for subsequent facial recognition on the target image, thereby obtaining a facial recognition result.

If the facial recognition result indicates that the user 510 passes identity authentication, the smartphone 530 may initiate an order payment request to the payment server 550 for the to-be-paid order to finish a payment process of the to-be-paid order.

In the foregoing example, through a plurality of row transformation reconstructions and one matrix multiplication reconstruction in the convolutional layer, a plurality of matrix multiplications and one element-wise multiplication are avoided in the convolutional layer, so that a computational volume of the convolutional layer is greatly reduced, and computing efficiency of the convolutional neural network model is further improved effectively, thereby helping to improve efficiency of the facial recognition.

Figure 15:
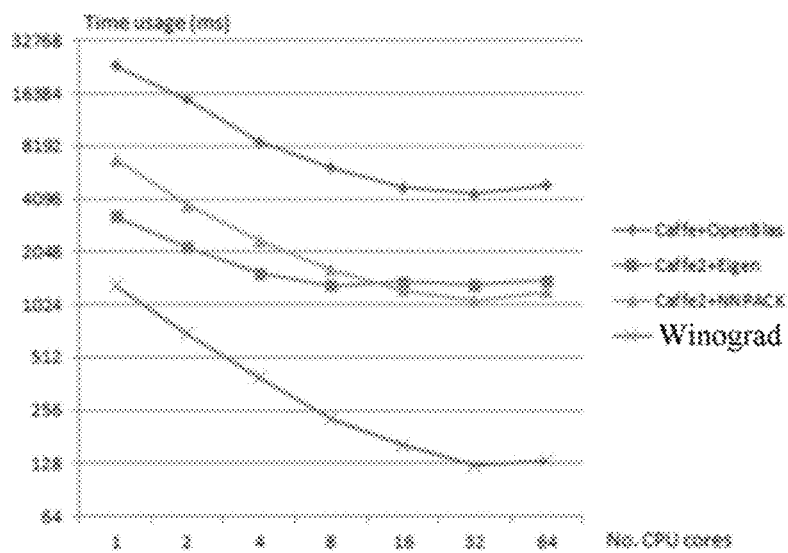
FIG. 15 is a chart illustrating a comparison between image recognition performance of an image recognition method according to an embodiment and that of another algorithm.

As shown in FIG. 15, in an aspect of peak value performance, the row transformation reconstruction and matrix multiplication reconstruction method provided according to embodiments of the disclosure is 8.67 to 35.4 times faster than other conventional algorithms.

In addition, Table 1 below shows image recognition performance of embodiments of the disclosure for smartphones of different models (A1 to A4) under different quantities (1 to 4) of threads. As shown in FIG. 1, the image recognition method according to the embodiments has better compatibility, and peak value performance may reach performing image recognition within 357.75 ms.

TABLE 1

Image recognition performance of smartphones of different models under different quantities of threads.

| | Quantity of threads | | | |
|---|---|---|---|---|
| Model | 1 | 2 | 3 | 4 |
| A1 | 1646.87 | 1041.91 | 815.72 | 772.35 |
| A2 | 3789.93 | 1952.47 | 1161.289 | — |

TABLE 1-continued

Image recognition performance of smartphones of different models under different quantities of threads.

| Model | Quantity of threads | | | |
|---|---|---|---|---|
| | 1 | 2 | 3 | 4 |
| A3 | 556.85 | 357.75 | — | — |
| A4 | 1308.59 | 695.29 | 394.68 | 229.19 |

According to an embodiment, an apparatus may be configured to implement the image recognition method described above. Accordingly, some details may be omitted as they are provided in the descriptions above.

Figure 16:
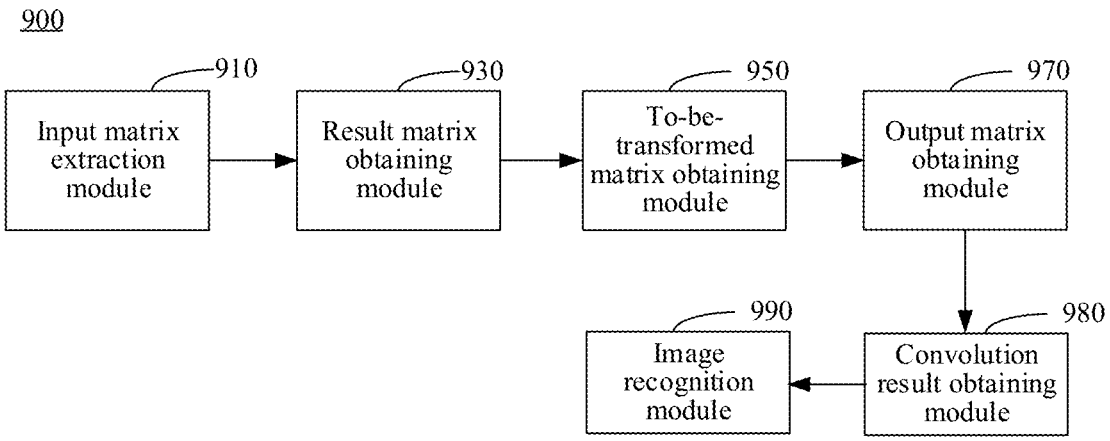
FIG. 16 is a block diagram of an image recognition apparatus according to an embodiment.

FIG. 16 is a block diagram of an image recognition apparatus 900 according to an embodiment. Referring to FIG. 16, an image recognition apparatus 900 may include an input matrix extraction module 910, a result matrix obtaining module 930, a to-be-transformed matrix obtaining module 950, an output matrix obtaining module 970, a convolution result obtaining module 980, and an image recognition module 990.

The input matrix extraction module 910 may be configured to extract a plurality of input matrices from a target image inputted into input channels of a convolutional layer in a convolutional neural network model, the convolutional neural network model being deployed in an electronic device for image recognition.

The result matrix obtaining module 930 may be configured to traverse the plurality of input matrices, perform input transformation on the traversed input matrices through row transformation reconstruction to obtain first result matrices, and perform convolution kernel transformation on the traversed input matrices through row transformation reconstruction to obtain second result matrices.

The to-be-transformed matrix obtaining module 950 may be configured to perform matrix multiplication reconstruction on the first result matrices and the second result matrices to obtain to-be-transformed matrices.

The output matrix obtaining module 970 may be configured to perform output transformation on the to-be-transformed matrices through row transformation reconstruction to obtain a plurality of output matrices.

The convolution result obtaining module 980 may be configured to splice the plurality of output matrices after all the input matrices are traversed, and output the plurality of output matrices through output channels of the convolutional layer to obtain a convolution result, each output matrix corresponding to each input matrix.

The image recognition module 990 may be configured to input the convolution result into a pooling layer in the convolutional neural network model, and perform image recognition on the target image to obtain an image recognition result.

Figure 17:
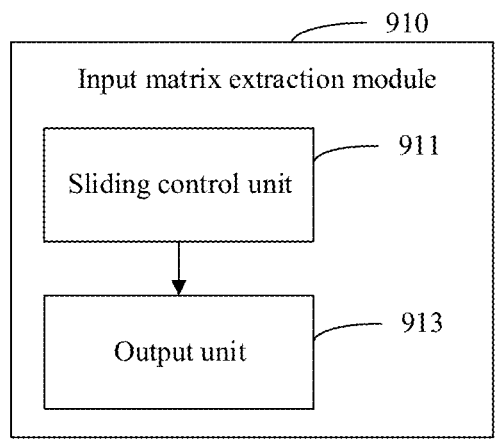
FIG. 17 is a block diagram of an input matrix extraction module according to an embodiment.

FIG. 17 is a block diagram of an input matrix extraction module 910 according to an embodiment. Referring to FIG. 17, the input matrix extraction module 910 may include a sliding control unit 911 and an output unit 913.

The sliding control unit 911 may be configured to control sliding windows to slide in the target image, and perform image segmentation on the target image to obtain a plurality of segmented images, each segmented image corresponding to a sliding location of the sliding window in a case that the sliding windows slide in the target image.

The output unit 913 may be configured to output the plurality of segmented images through the input channels of the convolutional layer to obtain the plurality of input matrices, each input matrix corresponding to one segmented image, and a size of each input matrix being equal to a specified size of the sliding window.

According to an embodiment, the convolution result obtaining module 980 may include a sliding splicing unit.

The sliding splicing unit may be configured to splice the plurality of output matrices according to the sliding locations of the sliding windows in a case that the sliding windows slide in the target image, and output the plurality of output matrices through the output channels of the convolutional layer to obtain the convolution result.

Figure 18:
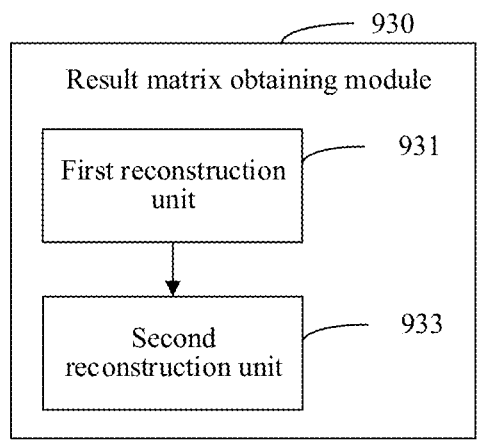
FIG. 18 is a block diagram of a result matrix obtaining module according to an embodiment.

FIG. 18 is a block diagram of a result matrix obtaining module 930 according to an embodiment. Referring to FIG. 18, the result matrix obtaining module 930 may include a first reconstruction unit 931 and a second reconstruction unit 933.

The first reconstruction unit 931 may be configured to perform row transformation on the traversed input matrix by using an input parameter matrix to obtain the first result matrix.

The second reconstruction unit 933 may be configured to obtain a convolution kernel matrix corresponding to the input matrix, and perform row transformation on the convolution kernel matrix by using a convolution parameter matrix to obtain the second result matrix.

According to an embodiment, the output matrix obtaining module 970 may include a third reconstruction unit.

The third reconstruction unit may be configured to perform row transformation on the to-be-transformed matrix by using an output parameter matrix to obtain the output matrix.

Figure 19:
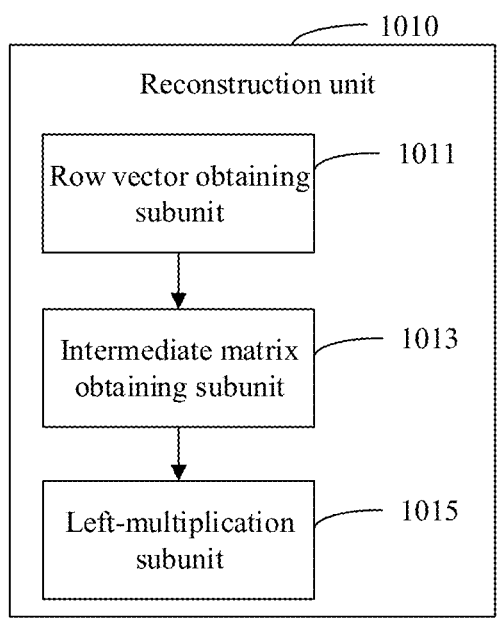
FIG. 19 is a block diagram of a reconstruction unit according to an embodiment.

FIG. 19 is a block diagram of a reconstruction unit 1010 according to an embodiment. Referring to FIG. 19, the reconstruction unit 1010 may perform reconstruction based on a reconstruction parameter matrix that includes the input parameter matrix, the convolution parameter matrix, or the output parameter matrix.

A reconstruction input matrix includes the input matrix, the convolution kernel matrix corresponding to the input matrix, or the to-be-transformed matrix.

A reconstruction output matrix includes the first result matrix, the second result matrix, or the output matrix.

The reconstruction unit 1010 may include a row vector obtaining subunit 1011, an intermediate matrix obtaining subunit 1013, and a left-multiplication subunit 1015.

The row vector obtaining subunit 1011 may be configured to splice, for each row in the reconstruction input matrix, elements of the row in the reconstruction input matrix into a row vector corresponding to the row, row vectors corresponding to rows of the reconstruction input matrix constituting a row vector matrix.

The intermediate matrix obtaining subunit 1013 may be configured to left-multiply the reconstruction parameter matrix by the row vector matrix to obtain an intermediate matrix.

The left-multiplication subunit 1015 may be configured to transpose the intermediate matrix, and left-multiply the reconstruction parameter matrix by the transposed intermediate matrix to obtain the reconstruction output matrix.

Figure 20:
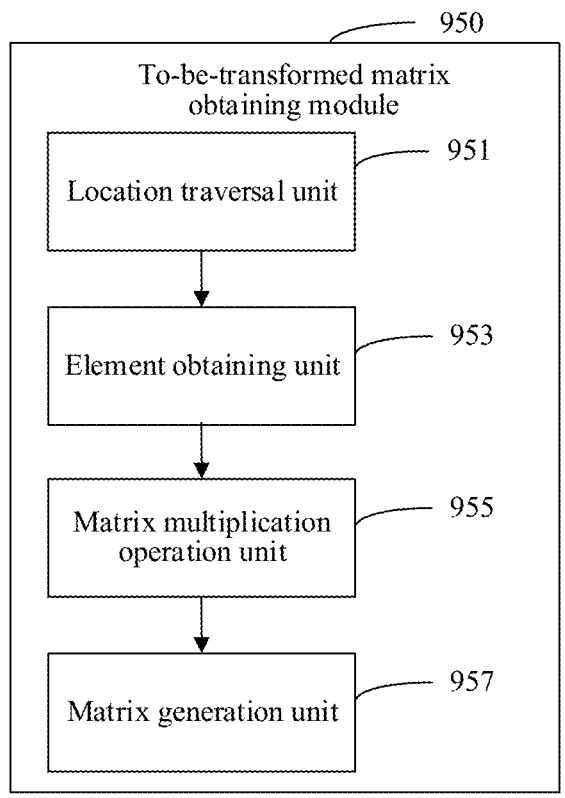
FIG. 20 is a block diagram of a to-be-transformed matrix obtaining module according to an embodiment.

FIG. 20 is a block diagram of a to-be-transformed matrix obtaining module 950 according to an embodiment. Referring to FIG. 20, the to-be-transformed matrix obtaining module 950 may include a location traversal unit 951, an element obtaining unit 953, a matrix multiplication operation unit 955, and a matrix generation unit 957.

The location traversal unit 951 may be configured to traverse locations of elements in the first result matrix and use the traversed location as a current location.

The element obtaining unit 953 may be configured to obtain a first element that is located at the current location and that is in the first result matrix, and a second element that is located at the current location and that is in the second result matrix.

The matrix multiplication operation unit 955 may be configured to perform a matrix multiplication operation on the obtained first element and the obtained second element to obtain an element that is located at the current location and that is in the to-be-transformed matrix.

The matrix generation unit 957 may be configured to generate the to-be-transformed matrix through the elements obtained through calculation in a case that locations of all the elements in the first result matrix are traversed.

According to an embodiment, the element obtaining unit 953 may include a traversal subunit, a matrix determining subunit, and an element extraction subunit.

The traversal subunit may be configured to sequentially traverse the output channels, the sliding windows, and the input channels according to sequences of the output channels, the sliding windows, and the input channels, to determine a current output channel, a current sliding window, and a current input channel that are traversed.

The matrix determining subunit may be configured to determine the first result matrix corresponding to the current input channel and the current sliding window, and the second result matrix corresponding to the current output channel and the current input channel.

The element extraction subunit may be configured to respectively extract elements that are located at the current location and that are in the determined first result matrix and the determined second result matrix, to obtain the first element and the second element.

In an embodiment, the matrix multiplication operation unit 955 may include a multiplication operation subunit and an accumulation operation subunit.

The multiplication operation subunit may be configured to perform a multiplication operation according to the obtained first element and the obtained second element to obtain a product result corresponding to the current output channel, the current sliding window, and the current input channel, and obtain a plurality of product results until all the output channels, all the sliding windows, and all the output channels are traversed.

The accumulation operation subunit may be configured to perform an accumulation operation on the plurality of product results to obtain an accumulation result corresponding to the current location, the accumulation result being used as the element that is located at the current location and that is in the to-be-transformed matrix.

In an embodiment, the matrix generation unit 957 may include an accumulation result obtaining subunit and an accumulation result splicing subunit.

The accumulation result obtaining subunit may be configured to obtain a plurality of accumulation results in a case that the locations of all the elements in the first result matrix are traversed, each accumulation result corresponding to a location of an element.

The accumulation result splicing subunit may be configured to splice the plurality of accumulation results according to the locations of the corresponding elements to obtain the to-be-transformed matrix.

In an embodiment, the image recognition module 990 may include a feature compression unit, a feature splicing unit, and a result output unit.

The feature compression unit may be configured to perform feature compression on the convolution result through the pooling layer in the convolutional neural network model.

The feature splicing unit may be configured to perform connection for a compressed feature through a fully-connected layer, and input the compressed feature into a loss layer.

The result output unit may be configured to calculate a loss value of the loss layer based on the input of the fully-connected layer, and output, through the loss layer, the image recognition result in a case that the loss value of the loss layer is minimum.

Although the image recognition apparatus provided in the foregoing embodiment is divided into various functional modules, this is only an example. In a practical application, the functions may be combined or modified according to different functional implementations, that is, an internal structure of the image recognition apparatus may be modified into different functional modules, so as to perform all or some of the functions described above.

Figure 21:
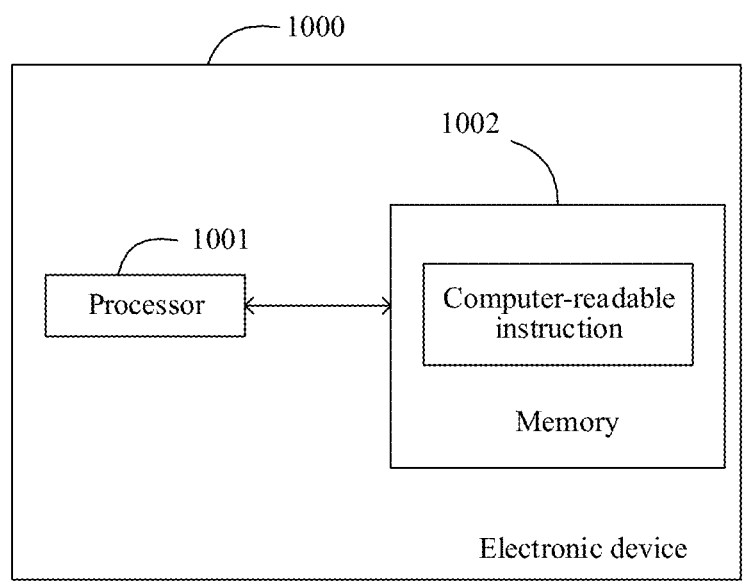
FIG. 21 is a block diagram of an electronic device according to an embodiment.

FIG. 21 is a block diagram of an electronic device 1000 according to an embodiment. Referring to FIG. 21, an electronic device 1000 may include a processor 1001 and a memory 1002. Although the electronic device 1000 is illustrated as including only one processor and one memory, there may be more than one processor and more than one memory configured in the electronic device 1000.

The memory 1002 stores a computer-readable instruction, the computer-readable instruction, when executed by the processor 1001, performs the image recognition method in the foregoing embodiments.

In an embodiment, a storage medium storing a computer program may be provided. The computer program, when executed by a processor, may perform the image recognition method in the foregoing embodiments.

The foregoing embodiments of the disclosure are merely examples, and are not intended to limit the scope of the disclosure. A person of ordinary skill in the art may make modifications and variations without departing from the spirit and scope of the disclosure.

What is claimed is:

1. An image recognition method, performed by an electronic device, the method comprising:
    extracting a plurality of input matrices from a target image through input channels of a convolutional layer in a convolutional neural network model, the convolutional neural network model being executed in the electronic device;
    obtaining first result matrices by traversing the plurality of input matrices and performing input transformation on the traversed plurality of input matrices through row transformation reconstruction;
    obtaining second result matrices by performing convolution kernel transformation on the traversed plurality of input matrices through the row transformation reconstruction;
    performing matrix multiplication reconstruction on the first result matrices and the second result matrices to obtain to-be-transformed matrices;
    performing output transformation on the to-be-transformed matrices through the row transformation reconstruction to obtain a plurality of output matrices;
    based on traversing all of the plurality of input matrices, splicing the plurality of output matrices and outputting the spliced plurality of output matrices through output channels of the convolutional layer to obtain a convolution result, each spliced output matrix among the plurality of spliced output matrices corresponding to each input matrix among the plurality of input matrices; and obtaining an image recognition result by inputting the convolution result into a pooling layer in the convolutional neural network model to perform an image recognition on the target image.

2. The method according to claim 1, wherein the extracting the plurality of input matrices from the target image through the input channels of the convolutional layer comprises:

controlling sliding windows to slide in the target image, and performing an image segmentation on the target image to obtain a plurality of segmented images, each segmented image corresponding to a sliding location of the sliding window; and outputting the plurality of segmented images through the input channels of the convolutional layer to obtain the plurality of input matrices, each input matrix corresponding to each of the plurality of segmented images, and a size of each input matrix being equal to a specified size of the sliding window.

3. The method according to claim 2, wherein the splicing the plurality of output matrices and outputting the plurality of output matrices through the output channels of the convolutional layer further comprises:

splicing the plurality of output matrices according to the sliding locations of the sliding windows.

4. The method according to claim 1, wherein the obtaining the first result matrices further comprises performing row transformation on the traversed plurality of input matrices based on an input parameter matrix, and wherein the obtaining the second result matrices further comprises obtaining a convolution kernel matrix corresponding to the input matrix, and performing row transformation on the convolution kernel matrix based on a convolution parameter matrix.

5. The method according to claim 4, wherein the performing the output transformation on the to-be-transformed matrices through row transformation reconstruction further comprises performing row transformation on the to-be-transformed matrix based on an output parameter matrix.

6. The method according to claim 5, wherein a reconstruction parameter matrix comprises at least one of the input parameter matrix, the convolution parameter matrix, or the output parameter matrix, wherein a reconstruction input matrix comprises at least one of the input matrix, the convolution kernel matrix corresponding to the input matrix, or the to-be-transformed matrix, wherein a reconstruction output matrix comprises at least one of the first result matrix, the second result matrix, or the output matrix, and wherein the method further comprises:

performing the row transformation on the reconstruction input matrix through the reconstruction parameter matrix to obtain the reconstruction output matrix;

splicing, for each row in the reconstruction input matrix, elements of the row in the reconstruction input matrix into a row vector corresponding to the row, row vectors corresponding to rows of the reconstruction input matrix constituting a row vector matrix;

left-multiplying the reconstruction parameter matrix by the row vector matrix to obtain an intermediate matrix; and transposing the intermediate matrix, and left-multiplying the reconstruction parameter matrix by the transposed intermediate matrix to obtain the reconstruction output matrix.

7. The method according to claim 3, wherein the performing matrix multiplication reconstruction on the first result matrices and the second result matrices comprises:

traversing locations of elements in the first result matrix, and using the traversed location as a current location;

obtaining a first element located at the current location in the first result matrix and obtaining a second element that is located at the current location in the second result matrix;

performing a matrix multiplication operation on the obtained first element and the obtained second element to obtain an element that is located at the current location and that is in the to-be-transformed matrix; and generating the to-be-transformed matrix from the elements obtained through calculation based on locations of all the elements in the first result matrix being traversed.

8. The method according to claim 7, wherein the obtaining the first element located at the current location in the first result matrix and the second element located at the current location in the second result matrix comprises:

sequentially traversing the output channels, the sliding windows, and the input channels according to a sequence of the output channels, the sliding windows, and the input channels, to determine a current output channel, a current sliding window, and a current input channel that are traversed;

determining the first result matrix corresponding to the current input channel and the current sliding window, and the second result matrix corresponding to the current output channel and the current input channel; and respectively extracting elements that are located at the current location and that are in the determined first result matrix and the determined second result matrix to obtain the first element and the second element.

9. The method according to claim 8, wherein the performing the matrix multiplication operation on the obtained first element and the obtained second element to obtain the element that is located at the current location and that is in the to-be-transformed matrix comprises:

performing the multiplication operation according to the obtained first element and the obtained second element to obtain a product result corresponding to the current output channel, the current sliding window, and the current input channel, and obtaining a plurality of product results based on all the output channels, all the sliding windows, and all the output channels being traversed; and performing an accumulation operation on the plurality of product results to obtain an accumulation result corresponding to the current location, the accumulation result being used as the element that is located at the current location and that is in the to-be-transformed matrix.

10. The method according to claim 9, wherein the generating the to-be-transformed matrix from the elements obtained through calculation based on locations of all the elements in the first result matrix being traversed comprises:

obtaining a plurality of accumulation results based on the locations of all the elements in the first result matrix being traversed, each accumulation result corresponding to a location of an element; and splicing the plurality of accumulation results according to the locations of the corresponding elements to obtain the to-be-transformed matrix.

11. The method according to claim 1, wherein the obtaining the image recognition result by inputting the convolution result into the pooling layer in the convolutional neural network model comprises:

performing feature compression on the convolution result through the pooling layer in the convolutional neural network model;

connecting a compressed feature through a fully-connected layer, and inputting the compressed feature into a loss layer; and calculating a loss value of the loss layer based on the input of the fully-connected layer, and outputting, by the loss layer, the image recognition result based on the loss value of the loss layer being a minimum value.

12. An image recognition apparatus, comprising:

at least one memory configured to store computer program code; and at least one processor configured to access the computer program code and operate as instructed by the computer program code, the computer program code comprising:

an input matrix extraction code configured to cause the at least one processor to extract a plurality of input matrices from a target image through input channels of a convolutional layer in a convolutional neural network model, the convolutional neural network model being executed in the image recognition apparatus;

a result matrix obtaining code configured to cause the at least one processor to obtain first result matrices by traversing the plurality of input matrices and performing input transformation on the traversed plurality of input matrices through row transformation reconstruction, and obtain second result matrices by performing convolution kernel transformation on the traversed plurality of input matrices through row transformation reconstruction;

a to-be-transformed matrix obtaining code configured to cause the at least one processor to perform matrix multiplication reconstruction on the first result matrices and the second result matrices to obtain to-be-transformed matrices;

an output matrix obtaining code configured to cause the at least one processor to perform output transformation on the to-be-transformed matrices through row transformation reconstruction to obtain a plurality of output matrices;

a convolution result obtaining code configured to cause the at least one processor to, based on traversing all of the plurality of input matrices, splice the plurality of output matrices and output the spliced plurality of output matrices through output channels of the convolutional layer to obtain a convolution result, each spliced output matrix among the plurality of spliced output matrices corresponding to each input matrix among the plurality of input matrices; and an image recognition code configured to cause the at least one processor to obtain an image recognition result by inputting the convolution result into a pooling layer in the convolutional neural network model and performing an image recognition on the target image.

13. The apparatus according to claim 12, wherein the input matrix extraction code comprises:

a sliding control code configured to cause the at least one processor to control sliding windows to slide in the target image, and perform an image segmentation on the target image to obtain a plurality of segmented images, each segmented image corresponding to a sliding location of the sliding window; and an output code configured to cause the at least one processor to output the plurality of segmented images through the input channels of the convolutional layer to obtain the plurality of input matrices, each input matrix corresponding to each of the plurality of segmented images, and a size of each input matrix being equal to a specified size of the sliding window.

14. The apparatus according to claim 13, wherein the convolution result obtaining code comprises:

a sliding splicing code configured to cause the at least one processor to splice the plurality of output matrices according to the sliding locations of the sliding windows.

15. The apparatus according to claim 12, wherein the result matrix obtaining code comprises:

a first reconstruction code configured to cause the at least one processor to perform row transformation on the traversed plurality of input matrices based on an input parameter matrix; and a second reconstruction code configured to cause the at least one processor to obtain a convolution kernel matrix corresponding to the input matrix, and perform row transformation on the convolution kernel matrix based on a convolution parameter matrix.

16. The apparatus according to claim 15, wherein the output matrix obtaining code comprises:

a third reconstruction code configured to cause the at least one processor to perform row transformation on the to-be-transformed matrix based on an output parameter matrix.

17. The apparatus according to claim 16, wherein the reconstruction parameter matrix comprises at least one of the input parameter matrix, the convolution parameter matrix, or the output parameter matrix, wherein a reconstruction input matrix comprises at least one of the input matrix, the convolution kernel matrix corresponding to the input matrix, or the to-be-transformed matrix, wherein a reconstruction output matrix comprises at least one of the first result matrix, the second result matrix, or the output matrix, and wherein a reconstruction unit comprises the first reconstruction unit, the second reconstruction unit, or the third reconstruction unit, the reconstruction unit comprising:

a row vector obtaining code configured to cause the at least one processor to splice, for each row in the reconstruction input matrix, elements of the row in the reconstruction input matrix into a row vector corresponding to the row, row vectors corresponding to rows of the reconstruction input matrix constituting a row vector matrix;

an intermediate matrix obtaining code configured to cause the at least one processor to left-multiply the reconstruction parameter matrix by the row vector matrix to obtain an intermediate matrix; and a left-multiplication code configured to cause the at least one processor to transpose the intermediate matrix, and left-multiply the reconstruction parameter matrix by the transposed intermediate matrix to obtain the reconstruction output matrix.

18. The apparatus according to claim 14, wherein the to-be-transformed matrices obtaining code comprises:
- a location traversal code configured to cause the at least one processor to traverse locations of elements in the first result matrix, and use the traversed location as a current location;
- an element obtaining code configured to cause the at least one processor to obtain a first element located at the current location in the first result matrix and obtain a second element located at the current location in the second result matrix;
- a matrix multiplication operation code configured to cause the at least one processor to perform a matrix multiplication operation on the obtained first element and the obtained second element to obtain an element that is located at the current location and that is in the to-be-transformed matrix; and
- a matrix generation code configured to cause the at least one processor to generate the to-be-transformed matrix from the elements obtained through calculation based on locations of all the elements in the first result matrix being traversed.

19. A non-transitory computer-readable storage medium, storing a computer program including at least one instruction, when executed by a processor, cause the computer program to:
- extract a plurality of input matrices from a target image through input channels of a convolutional layer in a convolutional neural network model;
- obtain first result matrices by traversing the plurality of input matrices and performing input transformation on the traversed plurality of input matrices through row transformation reconstruction, and obtain second result matrices by performing convolution kernel transformation on the traversed plurality of input matrices through row transformation reconstruction;
- perform matrix multiplication reconstruction on the first result matrices and the second result matrices to obtain to-be-transformed matrices;
- perform output transformation on the to-be-transformed matrices through row transformation reconstruction to obtain a plurality of output matrices;
- based on traversing all of the plurality of input matrices, splice the plurality of output matrices and output the spliced plurality of output matrices through output channels of the convolutional layer to obtain a convolution result, each spliced output matrix among the plurality of spliced output matrices corresponding to each input matrix among the plurality of input matrices; and
- obtain an image recognition result by inputting the convolution result into a pooling layer in the convolutional neural network model and performing an image recognition on the target image.

20. The non-transitory computer-readable storage medium of claim 19, wherein the computer program is further configured to:
- control sliding windows to slide in the target image, and perform an image segmentation on the target image to obtain a plurality of segmented images, each segmented image corresponding to a sliding location of the sliding window; and
- output the plurality of segmented images through the input channels of the convolutional layer to obtain the plurality of input matrices, each input matrix corresponding to each of the plurality of segmented images, and a size of each input matrix being equal to a specified size of the sliding window.

* * * * *